US009526127B1

(12) United States Patent
Taubman et al.

(10) Patent No.: US 9,526,127 B1
(45) Date of Patent: Dec. 20, 2016

(54) AFFECTING THE BEHAVIOR OF A USER DEVICE BASED ON A USER'S GAZE

(71) Applicant: Google Inc., Mountain View, CA (US)

(72) Inventors: Gabriel Taubman, Brooklyn, NY (US); William J. Byrne, Davis, CA (US)

(73) Assignee: Google Inc., Mountain View, CA (US)

( * ) Notice: Subject to any disclaimer, the term of this patent is extended or adjusted under 35 U.S.C. 154(b) by 175 days.

(21) Appl. No.: 13/676,517

(22) Filed: Nov. 14, 2012

Related U.S. Application Data

(60) Provisional application No. 61/561,505, filed on Nov. 18, 2011, provisional application No. 61/654,518, filed on Jun. 1, 2012, provisional application No. 61/654,745, filed on Aug. 1, 2012.

(51) Int. Cl.
*H04W 88/02* (2009.01)
*G06F 3/16* (2006.01)
*G10L 15/25* (2013.01)
*G10L 25/78* (2013.01)

(52) U.S. Cl.
CPC ...... *H04W 88/02* (2013.01); *A63F 2300/1093* (2013.01); *G06F 3/167* (2013.01); *G10L 15/25* (2013.01); *G10L 25/78* (2013.01)

(58) Field of Classification Search
CPC ......... H04W 88/02; G10L 15/25; G10L 25/78; A63F 2300/1093; G06F 3/167
See application file for complete search history.

(56) References Cited

U.S. PATENT DOCUMENTS

| | | | | |
|---|---|---|---|---|
| 6,754,373 | B1* | 6/2004 | de Cuetos | G06K 9/00335 382/118 |
| 8,451,314 | B1* | 5/2013 | Cline | G06F 19/3418 348/14.05 |
| 8,635,066 | B2* | 1/2014 | Morrison | G06K 9/00221 704/231 |
| 2002/0105575 | A1 | 8/2002 | Hinde et al. | |
| 2006/0111916 | A1* | 5/2006 | Chambers | G06F 3/0481 704/276 |
| 2008/0146289 | A1* | 6/2008 | Korneluk | H04M 1/6041 455/569.1 |
| 2009/0315827 | A1* | 12/2009 | Elvesjo | G06F 3/013 345/157 |
| 2010/0205667 | A1* | 8/2010 | Anderson | G06F 3/013 726/19 |
| 2011/0216093 | A1* | 9/2011 | Griffin | H04R 3/12 345/659 |
| 2012/0007713 | A1* | 1/2012 | Nasiri | G06F 1/1694 340/5.81 |
| 2012/0157114 | A1* | 6/2012 | Alameh | H04M 1/605 455/456.1 |

(Continued)

*Primary Examiner* — Mehmood B Khan
(74) *Attorney, Agent, or Firm* — Fish & Richardson P.C.

(57) ABSTRACT

A device may determine whether a user is facing a display screen associated with the device; and present feedback to the user. When presenting the feedback, the device may present visual information, that is based on the feedback, when determining that the user is facing the display screen associated with the device, and present audio information, that is based on the feedback, when determining that the user is not facing the display screen associated with the device. At least a portion of the audio information might not be presented when the visual information is presented when the user is facing the display screen associated with the device.

20 Claims, 14 Drawing Sheets

(56) References Cited

U.S. PATENT DOCUMENTS

| | | | |
|---|---|---|---|
| 2012/0259638 A1* | 10/2012 | Kalinli | G10L 15/25 704/270 |
| 2012/0300061 A1* | 11/2012 | Osman | G06F 1/3231 348/135 |
| 2013/0013316 A1 | 1/2013 | Burke et al. | |

* cited by examiner

AFFECTING THE BEHAVIOR OF A USER DEVICE BASED ON A USER'S GAZE

CROSS-REFERENCE TO RELATED APPLICATIONS

This application claims the benefit of U.S. Provisional Pat. App. No. 61/561,505, filed Nov. 18, 2011, U.S. Provisional Pat. App. No. 61/654,745, filed Jun. 1, 2012, and U.S. Provisional Pat. App. No. 61/654,518, filed Jun. 1, 2012, all of which are incorporated herein by reference.

BACKGROUND

User devices, such as mobile telephones, can provide users with information. For example, when a mobile telephone rings, the mobile telephone may provide a visual notification (e.g., a screen of the mobile telephone may display call information), an audible notification (e.g., a ring tone), and/or a sensory notification (e.g., the mobile telephone may vibrate).

SUMMARY

According to one general implementation, one or more notifications of a user device may be identified as redundant, based on estimating whether the gaze of the user of the user device is directed towards a display of the user device. For example, if a user's gaze is deemed to be directed towards the user device, the user may not need to hear a ring tone and/or feel a vibration, since the user can already see that a call has been received. Accordingly, the ring tone and/or vibration may be identified as redundant, and may not be output. In another example, the user's gaze may be directed away from the display of the user device and may not be able to see a visual notification. Accordingly, the visual notification may be identified as redundant, and may not be output.

According to one general implementation, a method includes obtaining, by a user device, an image of a user of the mobile device, determining, by the user device, to output a notification, determining, by the user device, that the image includes one or more features that are characteristic of the user facing a display of the mobile device, selecting, by the user device, a visual notification format for the notification based on determining that the image includes the one or more features that are characteristic of the user facing the display of the user device, formatting the notification according to the selected notification format; and outputting the notification. Other aspects include corresponding systems, apparatus, and computer programs, configured to perform the actions of the methods, encoded on computer storage devices.

Implementations may include one or more of the following features. Determining that the image includes one or more features that are characteristic of the user facing a display of the user device includes determining a direction of a gaze of the user, and classifying the gaze of the user as a gaze that is directed toward the display of the user device; determining that the image includes one or more features that are characteristic of the user facing a display of the user device includes determining that one or more particular facial features are visible in the image; determining that the image includes one or more features that are characteristic of the user facing a display of the user device includes determining an orientation of two or more particular facial features of the user with respect to each other; determining that the image includes one or more features that are characteristic of the user facing a display of the user device includes comparing the image to a different image in which the user is facing the display of the mobile device; selecting a visual notification format for the notification based on determining whether the image includes the one or more features that are characteristic of the user facing the display of the user device includes, when the image is determined to include the one or more features that are characteristic of the user facing the display of the user device, outputting the notification as a visual notification, and disabling audio notifications; and/or selecting a visual notification format for the notification based on determining whether the image includes the one or more features that are characteristic of the user facing the display of the user device includes, when the image is determined to include the one or more features that are characteristic of the user facing the display of the user device, outputting the notification as a visual notification, and disabling audio notifications or haptic notification.

According to another general implementation, a method includes obtaining, by a user device, an image of a user of the mobile device, determining, by the user device, to output a notification, determining, by the user device, that the image includes one or more features that are characteristic of the user not facing a display of the mobile device, selecting, by the user device, a non-visual notification format for the notification based on determining that the image includes the one or more features that are characteristic of the user not facing the display of the user device, formatting the notification according to the selected notification format, and outputting the notification. Other aspects include corresponding systems, apparatus, and computer programs, configured to perform the actions of the methods, encoded on computer storage devices.

Implementations may include one or more of the following features. For instance, determining that the image includes one or more features that are characteristic of the user not facing a display of the user device includes determining a direction of a gaze of the user, and classifying the gaze of the user as a gaze that is not directed toward the display of the user device; determining that the image includes one or more features that are characteristic of the user not facing a display of the user device includes determining that one or more particular facial features are not visible in the image; determining that the image includes one or more features that are characteristic of the user not facing a display of the user device includes determining an orientation of two or more particular facial features of the user with respect to each other; determining that the image includes one or more features that are characteristic of the user not facing a display of the user device includes comparing the image to a different image in which the user is facing the display of the mobile device; and/or selecting a non-visual notification format for the notification based on determining whether the image includes the one or more features that are characteristic of the user facing the display of the user device includes, when the image is determined not to include the one or more features that are characteristic of the user facing the display of the user device, outputting the notification as an audio notification or as a haptic notification, and disabling visual notifications.

According to another general implementation, a method includes obtaining, by a user device, an image of a user of the mobile device, determining, by the user device, to output a notification, determining, by the user device, whether the image includes one or more features that are characteristic of the user facing a display of the mobile device, selecting, by the user device, a notification format for the notification, from among a visual notification format or a non-visual notification format, based on determining whether the image includes the one or more features that are characteristic of the user facing the display of the user device, formatting the notification according to the selected notification format, and outputting the notification. Other aspects include corresponding systems, apparatus, and computer programs, configured to perform the actions of the methods, encoded on computer storage devices.

Implementations may include one or more of the following features. For instance, determining whether the image includes one or more features that are characteristic of the user facing a display of the user device includes determining a direction of a gaze of the user, and classifying the gaze of the user as a gaze that is directed toward the display of the user device or as a gaze that is not directed toward the display of the user device; determining whether the image includes one or more features that are characteristic of the user facing a display of the user device includes determining whether one or more particular facial features are visible in the image; and/or determining whether the image includes one or more features that are characteristic of the user facing a display of the user device includes determining an orientation of two or more particular facial features of the user with respect to each other.

According to another general implementation, a method includes obtaining, by a user device, an image of a user of the user device, determining, by the user device, whether the image includes one or more features that are characteristic of the user facing a display of the user device, and determining, by the user device, whether to prevent an utterance of the user from being processed as a voice input, based on determining whether the image includes the one or more features that are characteristic of the user acing the display of the user device. Other aspects include corresponding systems, apparatus, and computer programs, configured to perform the actions of the methods, encoded on computer storage devices.

Implementations may include one or more of the following features. For instance, determining whether to prevent an utterance of the user from being processed as a voice input, based on determining whether the image includes the one or more features that are characteristic of the user acing the display of the user device includes determining to prevent the utterance from being processed as a voice input when the image is determined to not include the one or more features; determining whether to prevent an utterance of the user from being processed as a voice input, based on determining whether the image includes the one or more features that are characteristic of the user acing the display of the user device includes determining to not prevent the utterance from being processed as a voice input when the image is determined to include the one or more features; the method includes disabling a microphone of the user device based on determining to prevent the utterance from being processed as a voice input; and/or the method includes discarding the voice input without inputting the voice input to a dialog engine based on determining to prevent the utterance from being processed as a voice input.

Advantageous implementations can include one or more of the following features. Power consumption of the user device may be reduced by eliminating redundant forms of notification. Only relevant notifications are presented to the user, based on an estimate of where the user's gaze is directed. For example, if the user's gaze is deemed to be directed away from the display, only non-visional notifications may be output, reducing power consumption when compared to producing both visual and non-visual notifications.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference number represent corresponding parts throughout.

DETAILED DESCRIPTION

User devices, such as cellular telephones, personal digital assistants ("PDAs"), laptop computers, desktop computers, etc., generally have multiple approaches for presenting information to users. For example, a user device may be capable of presenting visual information, e.g., through a display device associated with the user device; audible information, e.g., through a speaker associated with the user device; and/or sensory information e.g., by vibrating the user device. A user device equipped with a gaze detection module may also be able to classify a user's gaze as a gaze in which the user is looking at the display device associated with the user device, such as a display screen, or as a gaze in which the user is looking away from the display device.

Figure 1:
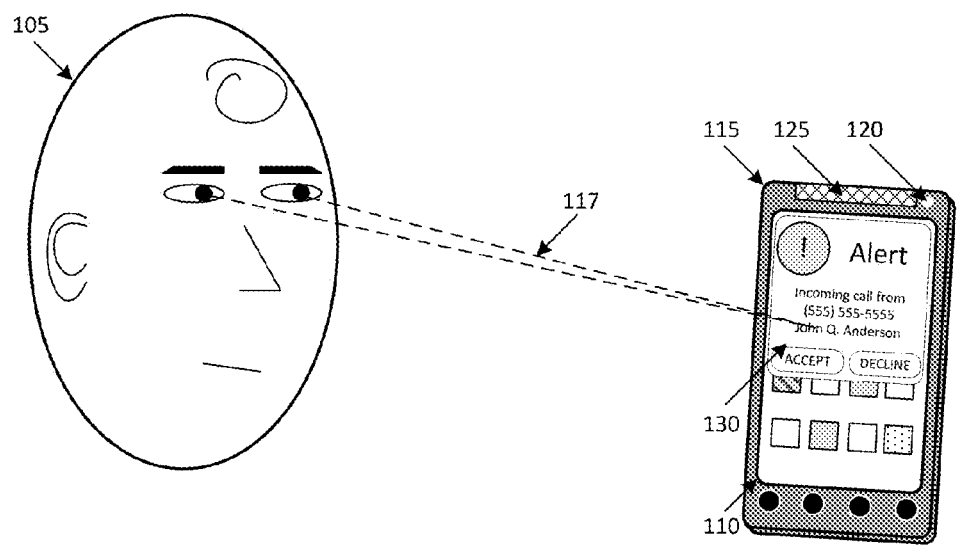
FIGS. 1 and 2 illustrate an overview of an example implementation described herein.
Figure 2:
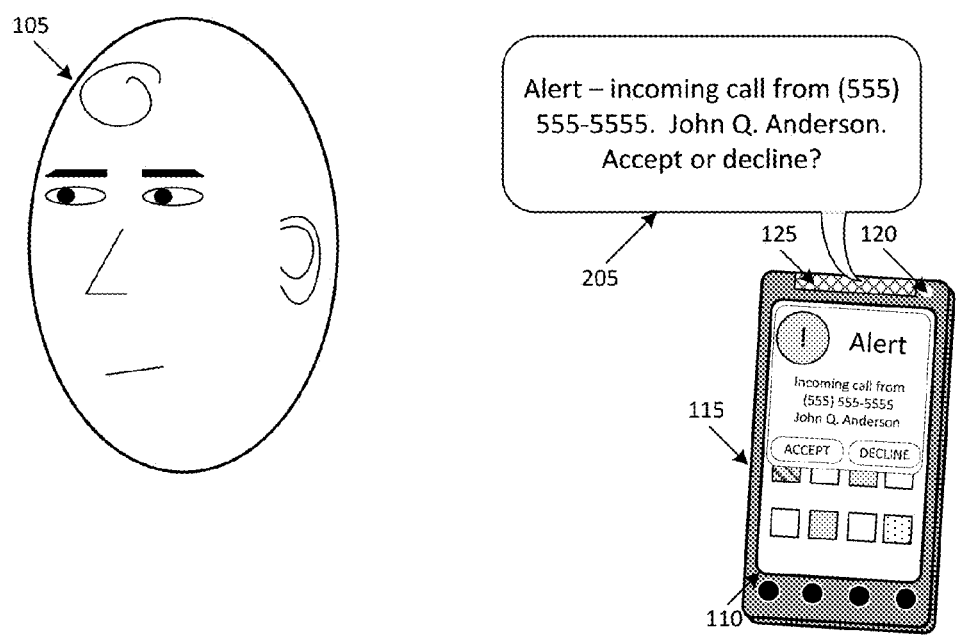

In one implementation, a system and/or method is described that enables a user device to present information in a manner that is based on whether the user's gaze is classified as being directed towards a display device associated with the user device. FIGS. 1 and 2 illustrate an overview of an example system and/or method described herein. As shown in FIG. 1, user 105 may be facing display screen 110 of user device 115, as indicated by dashed lines 117, which represent a gaze of user 105. User device 115 may also include camera 120 and speaker 125.

When user 105 is facing display screen 110, the gaze detection module of device 115 may classify the gaze of the user 105 as being directed towards the display screen 110, or as being directed away from display screen 110, by receiving and analyzing visual information using camera 120. For instance, camera 120 may capture image and/or video information. The gaze detection module then classifies whether the gaze of the user is directed towards the display module of the user device based on evaluating whether the image and/or video information obtained includes certain characteristic features that suggest that the user 105 is looking at display screen 110.

When the gaze detection module has classified the gaze of the user 105 as being directed towards the display screen 110, user device 115 may present visual information, such as visual notification 130, through display screen 110. As shown in FIG. 1, visual notification 130 may correspond to an incoming call. Visual notification 130 may also include one or more prompts for user input, such as "ACCEPT" or "DECLINE" buttons. Some or all of the visual information may be visual information that user device 115 does not provide when user 105 is not facing display screen 110.

Because user 105 is facing display screen 110, it may be unnecessary for user device 115 to provide additional information regarding the incoming call. Thus, in some implementations, when the gaze detection module has classified the gaze of user 105 as directed towards display screen 110, user device 115 may disable providing non-visual information, and/or may modify a manner of presenting non-visual information. For example, user device 115 may disable providing an audible notification, such as a ring, when the gaze detection module has classified the gaze of user 105 as directed towards display screen 110.

Disabling such a notification may override a user setting stored by user device 115. In other words, if user device 115 is associated with a profile that specifies that speaker 125 will output a ring at a specific volume when a call is received, user device 115 may disable outputting the ring, thus overriding the user setting. Additionally, or alternatively, user device 115 may output the ring at a different volume than the volume specified by the user setting, based on user device 115 identifying that the gaze of user 105 is directed towards display screen 110.

As shown in FIG. 2, user 105 may face away from display screen 110 of user device 115. The gaze detection module may classify the gaze of the user 105 as directed towards display screen 110 by receiving and analyzing visual information using camera 120. For instance, camera 120 may capture image and/or video information. The gaze detection module then classifies the gaze of the user as directed towards the display screen of the user device, or not, based on evaluating whether the image and/or video information obtained includes certain characteristic features that suggest that the user 105 is looking at display screen 110. When the gaze detection module has classified the gaze of the user 105 as directed away from display screen 110, user device 115 may present audible information, such as audible notification 205, through speaker 125.

In the example shown in FIG. 2, audible notification 205 may correspond to an incoming call. Audible notification 205 may include spoken words that are based on the incoming call. For example, audible notification 205 may identify that a call has been received, a phone number associated with the call, and/or a contact name associated with the call. Audible notification 205 may also include a prompt for information. For example, as shown in FIG. 2, audible notification 205 may ask user 105 whether user 105 wishes to accept or decline the phone call. Audible notification 205 may be based on a visual notification. For example, as shown in FIG. 1, the phone call may be associated with visual notification 130. Audible notification 205 may include one or more words, included in visual notification 130.

Thus, in some implementations, when the gaze detection module classifies the gaze of user 105 as directed away from display screen 110, user device 115 may present information in a non-visual manner, in order to properly alert user 105 of the information. Presenting such non-visual information may override a user setting stored by user device 115. In other words, if user device 115 is associated with a profile that specifies that speaker 125 will not output an audible notification when a call is received, user device 115 may output the audible notification when the gaze of user 105 is classified as directed away from display screen 110, thus overriding the user setting. Additionally, or alternatively, user device 115 may provide other non-visual information, such as a vibration, when the gaze of user 105 is classified as directed away from display screen 110. Further, some or all of the non-visual information may be non-visual information that user device 115 does not provide when the gaze of user 105 is classified as directed towards display screen 110.

In another implementation, a system and/or method is described that may enable a user device to receive and process information in a manner that is based on classifying the user as looking at a display device associated with the user device. The gaze detection module may classify the gaze of user 105 as directed towards display screen 110 by receiving and analyzing visual information through camera 120. For instance, camera 120 may capture image and/or video information. The gaze detection module then classifies the gaze of the user as directed towards the display module of the user device, or as directed away from the display, based on evaluating whether the image and/or video information obtained includes certain characteristic features that suggest that the user 105 is looking at display screen 110.

Figure 3:
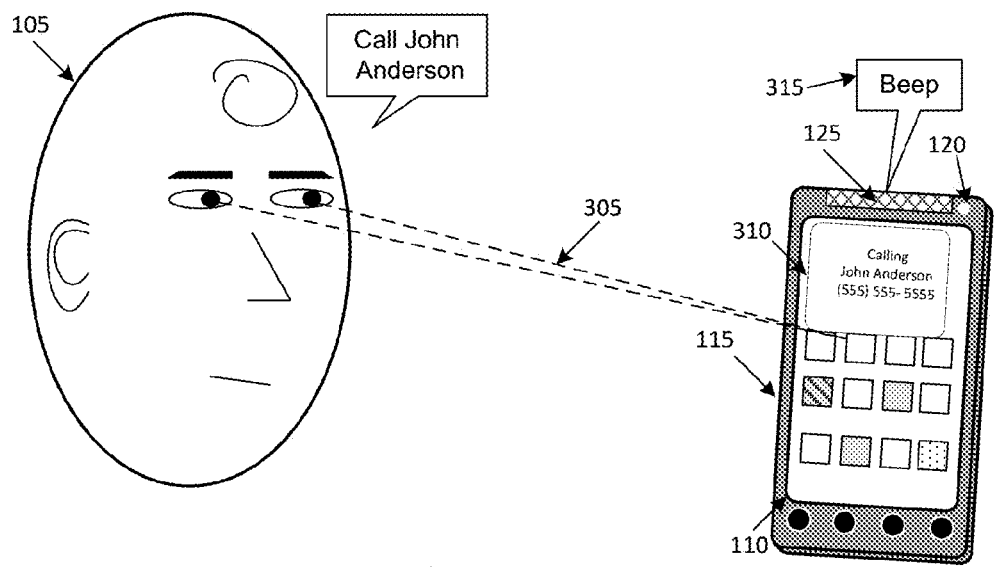
FIGS. 3 and 4 illustrate an overview of an example implementation described herein.

As shown in FIG. 3, user 105 may be facing display screen 110 of user device 115, as indicated by dashed lines 305, which represent the direction of the a gaze of user 105. In this situation, where user 105 is facing display screen 110, user 105 may speak a phrase, such as "Call John Anderson." User device 115 may detect, through an audio input device, such as a microphone, that user 105 has spoken the phrase. Since the gaze detection module has classified the gaze of user 105 as directed towards display screen 110, user device 115 may analyze the phrase to determine that the phrase corresponds to a voice command that causes user device 115 to initiate a call to a stored contact named John Anderson.

When processing the voice command, user device may provide one or more feedback indicators to user 105. For example, user device 115 may provide visual indicator 310 through display screen 110. Additionally, or alternatively, user device 115 may provide audible indicator 315 through speaker 125. Visual indicator 310 and/or audible indicator 315 may provide information regarding the voice command. The information may include an indication that a call was made, an identification of the contact, etc. The information may further include a generic indication, such as a flashing light, an audible tone, etc.

Thus, in some implementations, when the gaze detection module classifies the gaze of the user 105 as directed away from display screen 11, user device 115 may cease processing, or disable processing audio information such as words spoken by user 105. Doing so may avoid unintentional vocal commands from being issued to user device 115 by user 105.

Figure 4:
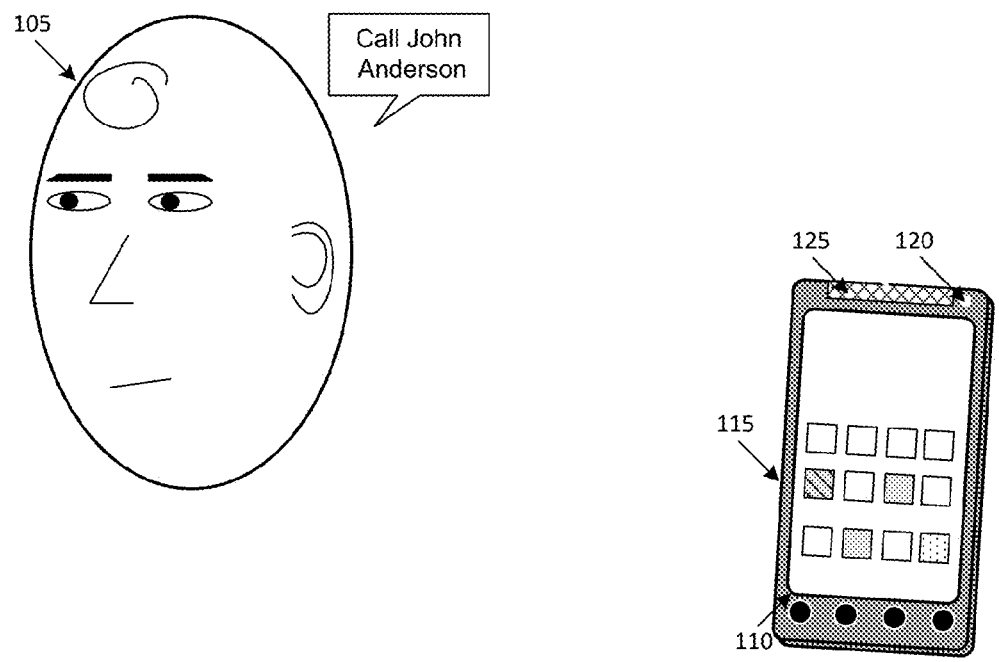

As shown in FIG. 4, user 105 may speak a phrase, such as "Call John Anderson." User device 115 may detect, through an audio input device, such as a microphone, that user 105 has spoken the phrase. However, user device 115 may not process the request, since the user's gaze is classified, by the gaze detection module, as directed away from display screen 110. Additionally, or alternatively, user 115 may disable the audio input device when the gaze of user 105 is classified as directed away from display screen 110. In such an implementation, user device 115 may not detect that the user has spoken the phrase.

Figure 5:
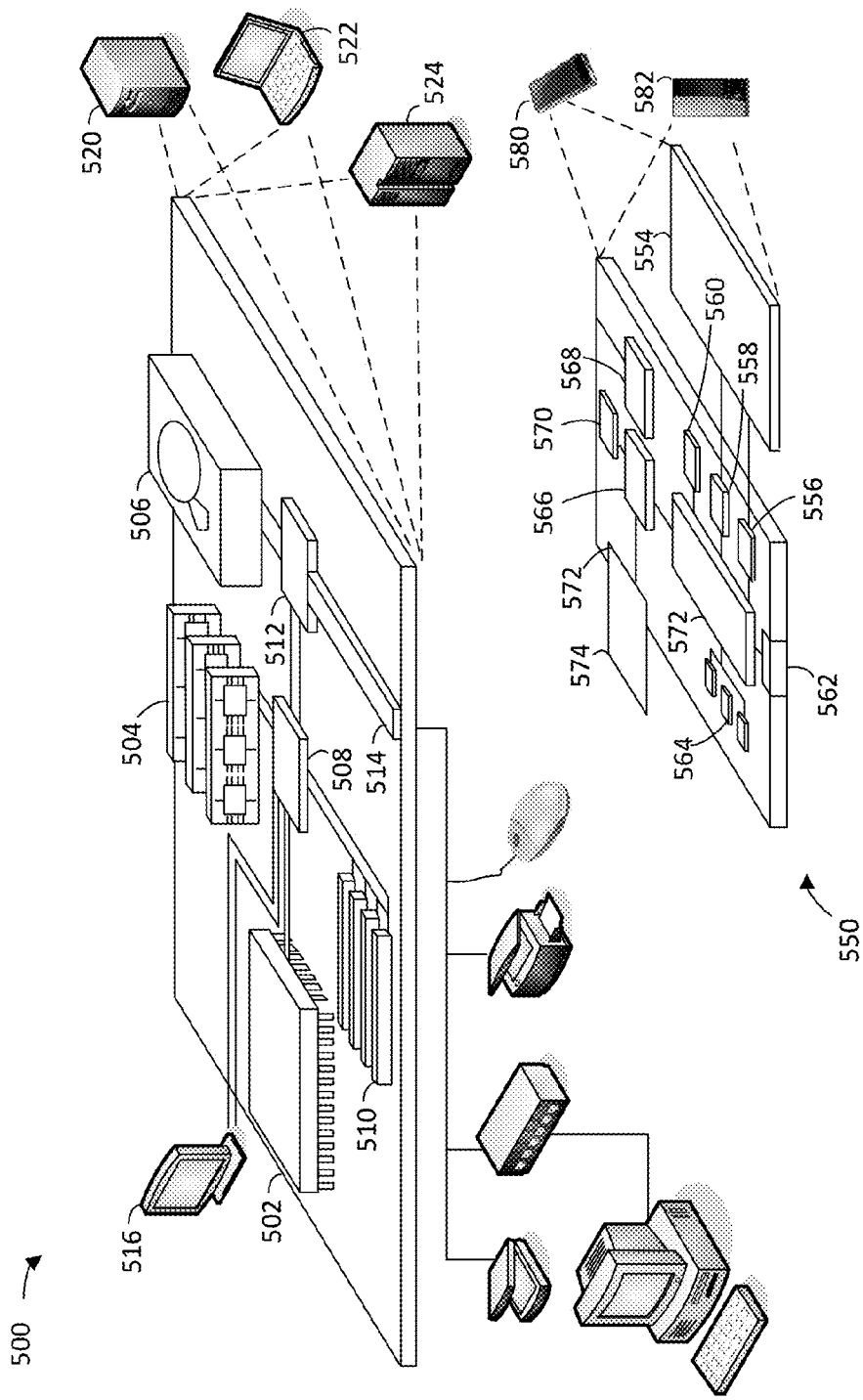
FIG. 5 shows an example of a generic computer device and a generic mobile computer device.

FIG. 5 shows an example of a generic computing device 500 and a generic mobile computing device 500, which may be used with the techniques described here. Generic computing device 500 and generic mobile computing device 550 may correspond to, for example user device 115. Computing device 500 is intended to represent various forms of digital computers, such as laptops, desktops, workstations, personal digital assistants, servers, blade servers, mainframes, and other appropriate computers. Mobile computing device 550 is intended to represent various forms of mobile devices, such as personal digital assistants, cellular telephones, smart phones, and other similar computing devices. The components shown in FIG. 5, their connections and relationships, and their functions, are meant to be examples only, and are not meant to limit implementations of the inventions described and/or claimed in this document.

Computing device 500 may include a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. Processor 502 can process instructions for execution within the computing device 500, including instructions stored in the memory 504 or on the storage device 506 to display graphical information for a graphical user interface ("GUI") on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system, etc.).

Memory 504 stores information within the computing device 500. In one implementation, memory 504 includes a volatile memory unit or units. In another implementation, memory 504 includes a non-volatile memory unit or units. The memory 504 may also be another form of computer-readable medium, such as a magnetic or optical disk. A computer-readable medium may be defined as a non-transitory memory device. A memory device may include space within a single physical memory device or spread across multiple physical memory devices.

The storage device 506 is capable of providing mass storage for the computing device 500. In one implementation, storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 504, storage device 506, or memory on processor 502.

High speed controller 508 manages bandwidth-intensive operations for the computing device 500, while low speed controller 512 manages lower bandwidth-intensive operations. Such allocation of functions is exemplary only. In one implementation, high-speed controller 508 is coupled to memory 504, display 516 (e.g., through a graphics processor or accelerator), and to high-speed expansion ports 510, which may accept various expansion cards (not shown). In this implementation, low-speed controller 512 is coupled to storage device 506 and low-speed expansion port 514. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as mobile computing device 550. Each of such devices may contain one or more of computing devices 500, 550, and an entire system may be made up of multiple computing devices 500, 550 communicating with each other.

Mobile computing device 550 may include a processor 552, memory 564 an input/output ("I/O") device such as a display 554 a communication interface 566, and a transceiver 568, among other components. Mobile computing device 550 may also be provided with a storage device, such as a micro-drive or other device, to provide additional storage. Each of the components 550, 552, 564, 554, 566, and 568 are interconnected using various buses, and several of the components may be mounted on a common motherboard or in other manners as appropriate.

Processor 552 can execute instructions within mobile computing device 550, including instructions stored in memory 564. Processor 552 may be implemented as a chipset of chips that include separate and multiple analog and digital processors. Processor 552 may provide, for example, for coordination of the other components of mobile computing device 550, such as control of user interfaces, applications run by mobile computing device 550, and wireless communication by mobile computing device 550.

Processor 552 may communicate with a user through control interface 558 and display interface 556 coupled to a display 554. Display 554 may be, for example, a TFT LCD (Thin-Film-Transistor Liquid Crystal Display) or an OLED (Organic Light Emitting Diode) display, or other appropriate display technology. Display interface 556 may comprise appropriate circuitry for driving display 554 to present graphical and other information to a user. Control interface 558 may receive commands from a user and convert them for submission to the processor 552. In addition, an external interface 562 may be provide in communication with processor 552, so as to enable near area communication of mobile computing device 550 with other devices. External interface 562 may provide, for example, for wired communication in some implementations, or for wireless communication in other implementations, and multiple interfaces may also be used.

Memory 564 stores information within mobile computing device 550. Memory 564 can be implemented as one or more of a computer-readable medium or media, a volatile memory unit or units, or a non-volatile memory unit or units. Expansion memory 574 may also be provided and connected to mobile computing device 550 through expansion interface 572, which may include, for example, a SIMM (Single In Line Memory Module) card interface. Such expansion memory 574 may provide extra storage space for device 550, or may also store applications or other information for mobile computing device 550. Specifically, expansion memory 574 may include instructions to carry out or supplement the processes described above, and may include secure information also. Thus, for example, expansion memory 574 may be provide as a security module for mobile computing device 550, and may be programmed with instructions that permit secure use of device 550. In addition, secure applications may be provided through the SIMM cards, along with additional information, such as placing identifying information on the SIMM card in a non-hackable manner.

Expansion memory 574 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as the memory 564 expansion memory 574, or memory on processor 552, that may be received, for example, over transceiver 568 or external interface 562.

Mobile computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to mobile computing device 550, which may be used as appropriate by applications running on mobile computing device 550.

Mobile computing device 550 may also communicate audibly using audio codec 560, which may receive spoken information from a user and convert it to usable digital information. Audio codec 560 may likewise generate audible sound for a user, such as through a speaker, e.g., in a handset of mobile computing device 550. Such sound may include sound from voice telephone calls, may include recorded sound (e.g., voice messages, music files, etc.) and may also include sound generated by applications operating on mobile computing device 550.

Mobile computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Figure 6:
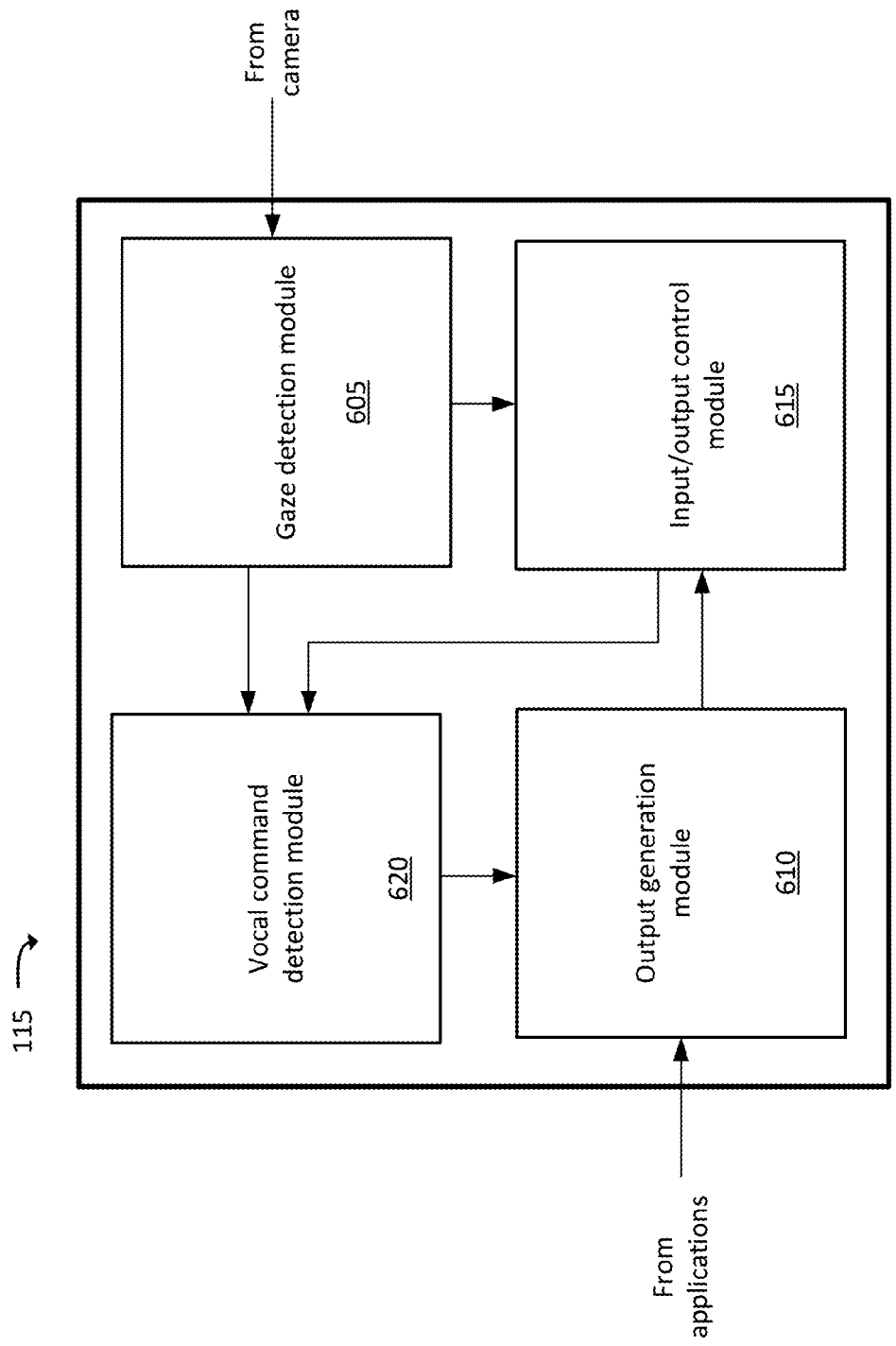
FIG. 6 is a diagram of example functional components of a user device shown in, for example, FIGS. 1-3.

FIG. 6 is a diagram of example functional components of user device 115. As shown in FIG. 6, user device 115 may include modules 605-620. Any, or all, of modules 605-620 may be implemented by one or more memory devices, such as memory 504 or memory 564, and/or one or more processors, such as processor 502 or processor 552. Furthermore, multiple modules may be associated with the same memory device and/or processor. For instance, one memory device, or one set of memory devices, may store information associated with two or more of modules 605-620.

Module 605 may receive image and/or video information from the integrated camera 120 of user device 115. The image and/or video information obtained from the camera 102 is used by the gaze detection module 605 to classify the gaze of the user as either directed toward a display device associated with user device 115 or directed away from the display device. Additionally, or alternatively, module 605 may receive images and/or video information from an external camera that is communicatively coupled to user device 115, through, for example, Bluetooth, or some other communication technique.

The gaze detection module 605 classifies the gaze of user 105 as either directed towards the display screen 110 or as directed away from the display screen 110, based on evaluating whether the image and/video information obtained includes certain characteristic features that suggest that the user 105 is facing display screen 110. In one implementation the gaze detection module 605 may classify the user's gaze on a range, for example between 0 and 1. In this implementation, a threshold value is used to determine if the gaze of the user will be classified as directed towards the display screen or as directed away from the display screen.

The gaze detection module 605 assigns a gaze classification score based on evaluating facial orientation characteristics in the images and/or video information captured by the camera 115. In one implementation, the threshold value may be 0.5, in this case, the gaze detection module classifies the gaze of the user as directed towards the display if the gaze classification score is 0.5 or greater. In another implementation, the threshold value may be 0.3, in this case, the gaze detection module classifies the gaze of a user as facing the display if the gaze classification score is 0.3 or greater.

In another implementation, each distinct facial orientation characteristic is assigned a weighted score by the gaze detection module 605. The weighted scores are summed to produce an overall gaze classification score. Examples of distinct facial orientation characteristics that can be used to assign a gaze classification score are (i) both pupils being centered in both eyes, (ii) eyes being centered, (iii) both ears being visible, (iv) both eyes being visible, and (v) mouth centered and visible. The weights for such a weighted score may be set using a model. For example, the score assigned by the gaze detection module based on the user's pupils being centered can contribute more or less heavily to the final gaze classification score than the user's mouth being centered and visible.

In one implementation the gaze of a user is considered to be directed towards the display device of the user device if the gaze score assigned is between 40 and 100 percent, on the other hand, the gaze of the user is considered to be directed away from display of the user device if the gaze score assigned is 39 percent and below. In such an implementation, a score is established for one or more of the facial orientation characteristics mention above, for example a score on a range of 0 and 10 can be established for one or more characteristic. The scores for each characteristic are summed together and divided by the number of characteristics used to evaluate the score, then multiplied by a predetermined value (in this example, 10).

For example, if five characteristics are used by the gaze detection module 605 to classify the user's gaze as directed towards the display of user device 115 or directed away from the display, each characteristic contributing a score on a scale of 0 to 10, then the final gaze score would be calculated by summing the scores for each characteristic and then dividing by the number of characteristics used (in this example, 5), then multiply by the predetermined value (in this example, 10).

In another implementation the gaze of the user may be considered to be directed towards the display once one or more of the facial orientation features are meet. For example if the user's eyes are centered and the ears are visible then the user is considered to be facing the display. In one implementation, when module 605 cannot definitively classify the gaze of the user 105 as directed towards display screen 110 or directed away from, module 605 may classify the gaze of user 105 as directed away from display screen 110. Alternatively, module 605 may classify the gaze of the user 105 as facing display screen 110 in such a situation.

In another implementation, the gaze detection module 605 may compare facial orientation characteristics from the images and/or video captured from the camera to an image of the primary user of device 115 looking at the display of the user device. In such implementations, the primary user of the device may be prompted to look at the display of the device and an image captured at that time can be stored in memory 504, to a profile associated with the user. The gaze detection module may compare features such as position and/or angle of the nose, eyes, pupils, ears and/or cheeks etc. between the stored profile picture of the primary user of the device and the image and/or video captured.

Module 610 may receive output information from one or more applications of user device 115, and/or from module 620. Module 610 may identify output that is to be presented by user device 115, based on receiving the output information from the one or more applications of user device 114 and/or from module 620. For example, module 610 may receive output information from a telephone application of user device 115 indicating that an incoming call has been received. The output information may identify, for example, a telephone number of the caller, a name of the caller, etc.

In another example, module 610 may receive output information from module 620, including a list of search results, from a search application. As will be further described later, the output information received from module 620 may correspond to, and/or be responsive to, a vocal command provided by the user of user device 115. The output information may identify, for example, a list of the names of nearby restaurants, which is responsive to a search query entered by user 105. In still another example, module 610 may receive output information associated with an incoming short messaging service ("SMS") message. The output information may include a telephone number of the sender of the SMS message, a name of the sender, content of the SMS message, etc.

Module 610 may output notification information to module 615, indicating that a notification is to be presented by user device 115. The notification information may include a type of notification, and other information associated with the notification. Each notification type may be associated with its own specific parameters. For example, the notification information may identify that the type of notification is a notification for an incoming phone call. The phone call type of notification may be associated with parameters that indicate a telephone number of the caller, and/or a name of the caller.

As another example, the notification information may identify that the type of notification is a notification for an incoming SMS message. The SMS message type of notification may be associated with parameters that indicate a telephone number of the sender, a name of the sender, and/or a content of the SMS message. Additionally, or alternatively, the notification information may include a generic type of notification. The generic type may, in one implementation, simply include text.

Module 615 may receive information from one or more of modules 605 and/or 610, and cause user device 115 to present and/or receive information based on the received information from modules 605 and/or 610. In other words, module 615 may cause user device 115 to present one or more visual and/or non-visual notifications to user 105, based on the type of notification, and/or whether user 105 is facing display screen 110. Module 615 may additionally, or alternatively, cause user device 115 to receive and/or process one or more vocal commands based on classifying user 105 as facing display screen 110.

Module 615 may store information associated with how to present notifications associated with one or more types, based on classifying the gaze of user 105 as facing display screen 110 or as not facing the display. For example, module 615 may store a set of parameters indicating that when the gaze of user 105 is classified as directed away from display screen 110, user device 115 will audibly present the words "Incoming call," and then audibly present caller identification information, such as a telephone number associated with the caller, when an incoming call type of notification is received. In this situation, module 615 may cause user device 115 not to present a visual notification regarding the incoming call notification, since the gaze of user 105 is classified as directed away from display screen 110.

As another example, module 615 may store a set of parameters indicating that, when module 615 receives an SMS message type of notification and the gaze of user 105 is classified as directed away from display screen 110, user device 115 will show a visible alert with the words "New text message from [sender]," where [sender] represents a name of the sender of the SMS message. In this situation, module 615 may cause user device 115 not to present a non-visual notification regarding the SMS message notification, since the gaze of user 105 is classified as directed towards display screen 110.

As a further example, module 615 may store a set of parameters indicating that, when module 615 receives a generic type of notification and the gaze of user 105 is classified as directed towards display screen 110, user device 115 will present a visual notification with some or all of the text included in the notification. In this situation, module 615 may cause user device 115 not to present a non-visual notification regarding the generic notification, since the gaze of user 105 is classified as directed towards display screen 110.

As yet another example, module 615 may store a set of parameters indicating that, when module 615 receives a generic type of notification and the gaze of user 105 is classified as directed away from display screen 110, user device 115 will present an audible notification with some or all of the text included in the notification. In other words, module 615 may cause user device 115 to use text-to-speech techniques to audibly present some or all of the text included in the notification. In this situation, module 615 may cause user device 115 not to present a visual notification regarding the generic notification, since user 105 is classified as not facing display screen 110.

Module 615 may also control an input device, such as a microphone, of user device 115, based on whether the gaze of the user is classified as directed towards the display or as directed away from the display. For example, when the user is not viewing display screen 110, module 615 may disable a microphone of user device 115. In other words, module 615 may place the microphone in a low-power or a no-power state. The low-power or the no-power state may consume less power than the microphone consumes when the microphone is activated, and/or receiving and/or processing audio input. Additionally, or alternatively, module 615 may notify module 620 regarding whether the gaze of the user is classified as directed away from display screen 110. As described below, module 620 may process audio input based on whether the gaze of the user is classified as directed towards display screen 110.

Module 620 may receive audio information, such as speech that is spoken by a user of user device 115. Module 620 may receive the audio information through an audio input device, such as a microphone, of user device 115. Module 620 may determine whether the audio information corresponds to a vocal command. For example, module 620 may receive audio information that includes the word "call," and then a sequence of numeric digits. Module 620 may determine that the audio information corresponds to a vocal command that causes user device 115 to initiate a telephone call, using at least a portion of the sequence of numeric digits as a telephone number. Module 620 may generate output information based on the vocal command, and provide the output information to module 610.

Module 620 may receive information from modules 605 and/or 615, indicating whether the gaze of the user is classified as directed towards display screen 110 of user device 115. In one implementation, module 620 may disable receiving and/or processing vocal commands, based on whether the gaze of the user is classified as directed towards display screen 110. For example, module 620 may cease processing received audio information when the gaze of the user is classified as directed away from display screen by the gaze detection module 605. Alternatively, module 620 may cease processing received audio information when the gaze of the user is classified as directed towards display screen 110.

Additionally, or alternatively, module 620 may not receive audio information, based on whether the gaze of the user is classified as directed towards display screen 110. For example, as described above, a microphone of user device 115 may be disabled based on whether the gaze of the user is classified as directed towards display screen 110. When the microphone is disabled, module 620 may not receive audio information.

The above-described parameters may further be based on other information stored by user device 115. For example, the above-described parameters may be further based on a time of day. In such an example, a user may specify that the user does not want to hear any audible notifications between the hours of 9:00 PM and 7:00 AM. The parameters described above may specify how to present output during these times. For instance, the parameters may specify that notifications during these times will be presented through vibrations when the gaze of user 105 is classified as directd away from display screen 110, while notifications during these times will be presented visually when the gaze of user 105 is classified as directed towards display screen 110.

Although FIG. 6 shows example modules of user device 115, in other implementations, user device 115 may include fewer, different, or additional modules than depicted in FIG. 6. In still other implementations, one or more modules of user device 115 may perform the tasks performed by one or more other modules of user device 115. Additionally, or alternatively, the functions of a single module may be performed by multiple modules. For example, in one implementation, module 620 may be implemented as two separate modules—one that controls the output of user device 115, and one that controls the input of user device 115.

Additionally, or alternatively, user device 115 may store information identifying times that user device 115 should present output independently of whether the gaze of user 105 is classified as directed towards display screen 110. For example, user device 115 may store information identifying that user device 115 should present output independently of whether the gaze of user 105 is classified as directed towards display screen 110 between the hours of 4:00 PM and 6:00 PM. Thus, during these times, user device 115 may not utilize one or more of modules 605-620.

Figure 7:
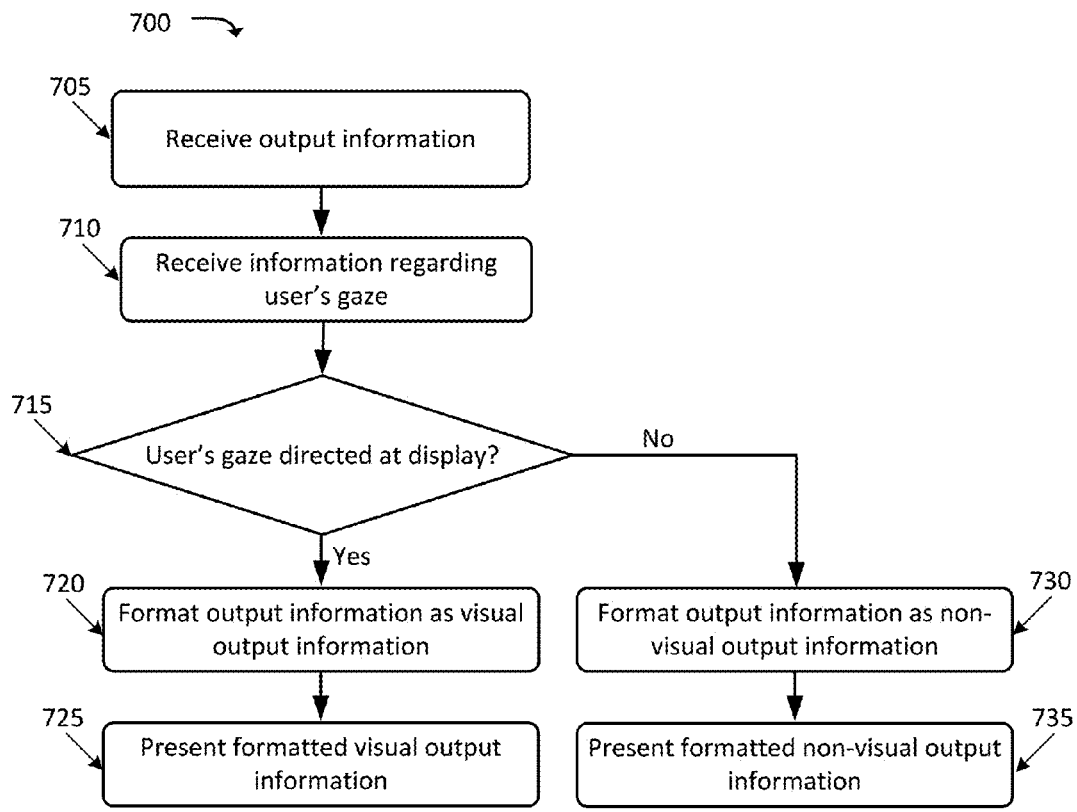
FIG. 7 illustrates a flowchart of an example process for providing information based on classifying a user as facing a display of a user device or as not facing the display of the user device.

FIG. 7 shows an example process 700 for presenting information based on whether the gaze of a user is classified as directed towards a display device associated with a user device. In one implementation, process 700 may be performed by user device 115. In another implementation, process 700 may be performed by one or more other components instead of, or possibly in conjunction with, user device 115.

As shown in FIG. 7, process 700 may include receiving output information (block 705). For example, module 610 of user device 115 may receive output information from one or more applications associated with user device 115. As discussed above, the output information may include information associated with, for example, an incoming phone call, a list of search results, an incoming SMS message, or any other type of output information that is to be presented, to a user, by user device 115.

Process 700 may further include receiving information regarding a user's gaze (block 710). For example, module 605 of user device 115 may receive information used to classify the gaze of the user 105 as facing display screen 110 or as not facing the display. As discussed above, the information may include video and/or image information captured by a camera, such as camera 120. As further discussed above, module 605 may classify the gaze of the user as facing display screen 110 or as not facing the display.

If module 605 classifies gaze of user 105 as facing display screen 110 (block 717—YES), process 700 may further include formatting the output information as visual output information (block 720). For example, as discussed above, module 615 may identify a type of output, and may format the visual output based on stored parameters associated with the type of output. For example, if the output is associated with an incoming call type, module 615 may format the visual output as a visual notification with the words "Incoming call from [telephone number] ([caller name])," with [telephone number] corresponding to a telephone number of the caller, and [caller name] corresponding to a name of the caller. Module 615 may further format the visual output to include one or more prompts for feedback from the user. For example, module 615 may format the visual output to include buttons that allow user 105 to accept or decline the incoming call.

If module 605 classifies the gaze of user 105 as facing display screen 110 (block 715—YES), process 700 may also include presenting the formatted visual output information (block 725). For example, user device 115 may display, through display screen 110, a visual notification, such as a dialog box with the words "Incoming call from [telephone number] ([caller name])," and with buttons that correspond to "Accept" and "Decline." When presenting the formatted visual output information (at block 725), user device 115 may switch display screen 110 from an "off" state, where display screen 110 does not display anything, to an "on" state, where display screen 110 presents the visual notification. Additionally, or alternatively, when presenting the formatted visual output information (at block 725), user device 115 may increase a brightness of display screen 110 from a first brightness, that is associated with display screen 110 before presenting the visual notification, to a second, higher brightness.

If, on the other hand, module 605 classifies the gaze of user 105 as not facing display screen 110 (block 715—NO), process 700 may include formatting the output information as non-visual output information (block 730). For example, as discussed above, module 615 may identify a type of output, and may format the non-visual output based on stored parameters associated with the type of output. For example, if the output is associated with an incoming call type, module 615 may format the non-visual output as an audible notification that includes the words "Incoming call from [caller name]. Accept or decline?" Additionally, or alternatively, module 615 may format the non-visual output to include one or more other types of non-visual notifications, such as causing user device 115 to vibrate.

If module 605 classifies the gaze of user 105 as not facing display screen 110 (block 715—NO), process 700 may also include presenting the formatted non-visual output information (block 735). For example, user device 115 may audibly present, through speaker 125, an audible notification, such as by audibly outputting the words "Incoming call from [caller name]. Accept or decline?"

While process 700 was described as including the above-mentioned blocks 705-735, some or all of these blocks may be considered optional. Furthermore, certain blocks may be performed in parallel with other blocks. Additionally, while blocks 720 and 725 are described in the context of presenting visual output, user device 115 may also present non-visual output when presenting visual output (at block 725). Similarly, while blocks 730 and 735 are described in the context of presenting non-visual output, user device 115 may also present visual output when presenting non-visual output (at block 735).

Figure 8:
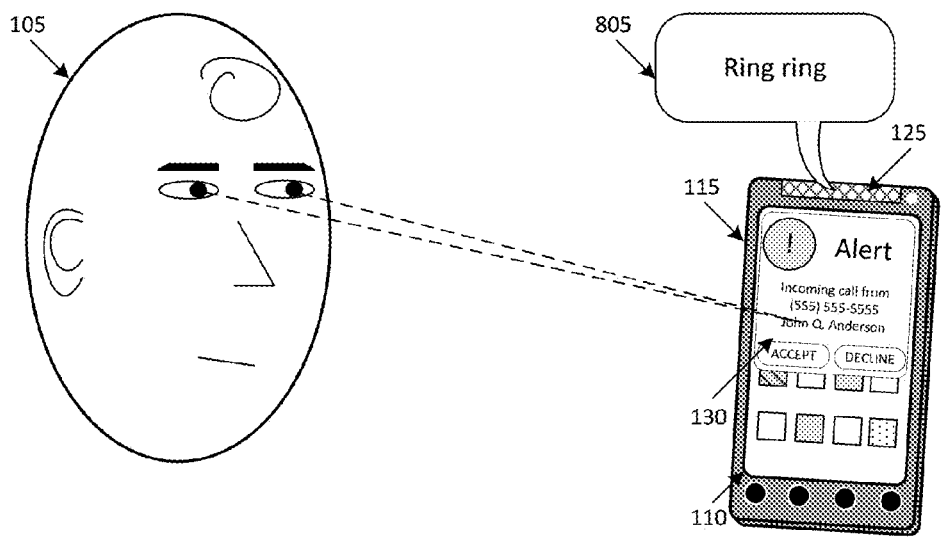
FIGS. 8-12 illustrate examples of providing information based on classifying a user as facing a display of a user device or as not facing the display of the user device.

FIGS. 8-11 illustrate examples of how user device 115 may present output, based on classifying by module 605, the gaze of user 105 as directed towards display screen 110 or as away from the display. As shown in FIG. 8, user 105 may be facing display screen 110. Gaze detection module 605 may classify the gaze of user 105 as facing display screen 110, and communicate with module 615 to output notifications accordingly. For example, module 615 may cause user device 115 to output visual notification 130 through display screen 110. User device 115 may also output audible notification 805, such as a ringing of a ring tone, through speaker 125.

Figure 9:
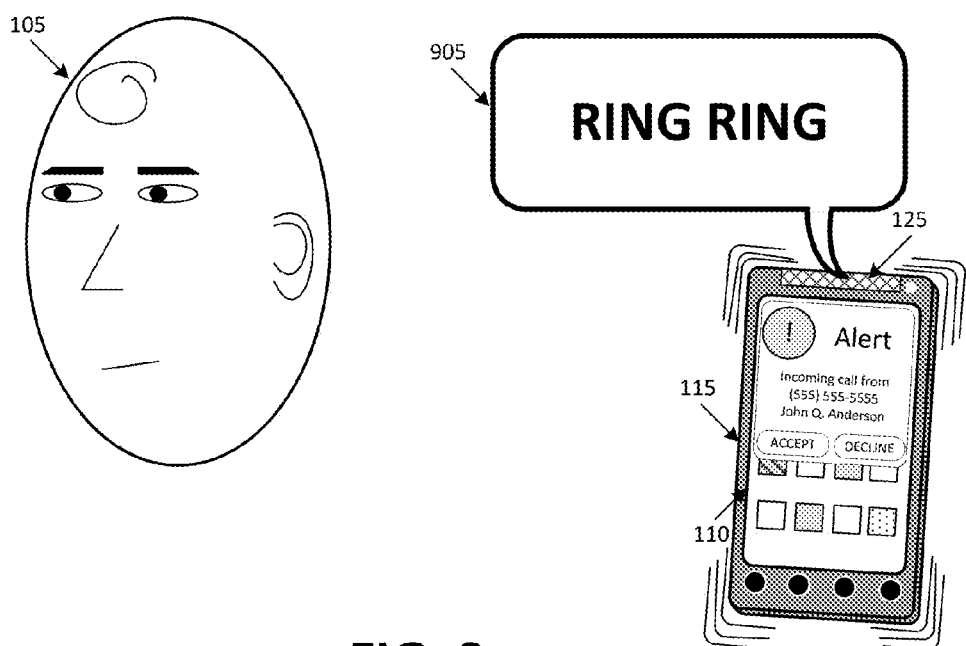

As shown in FIG. 9, user 105 may not be facing display screen 110. Gaze detection module 605 may classify the gaze of user 105 as not facing display screen 110, and communicate with module 615 to output notifications accordingly. For example, module 615 may cause user device 115 to output audible notification 905 through speaker 125. Audible notification 905, which is presented when user 105 is classified as not facing display screen 110, may be louder than audible notification 805, which is presented when user 105 is classified as facing display screen 110. Additionally, or alternatively, audible notification 905 may include a different ring tone than audible notification 805. As also shown in FIG. 9, user device 115 may vibrate, as a non-visual notification, when user 105 is classified as not facing user device 115.

Figure 10:
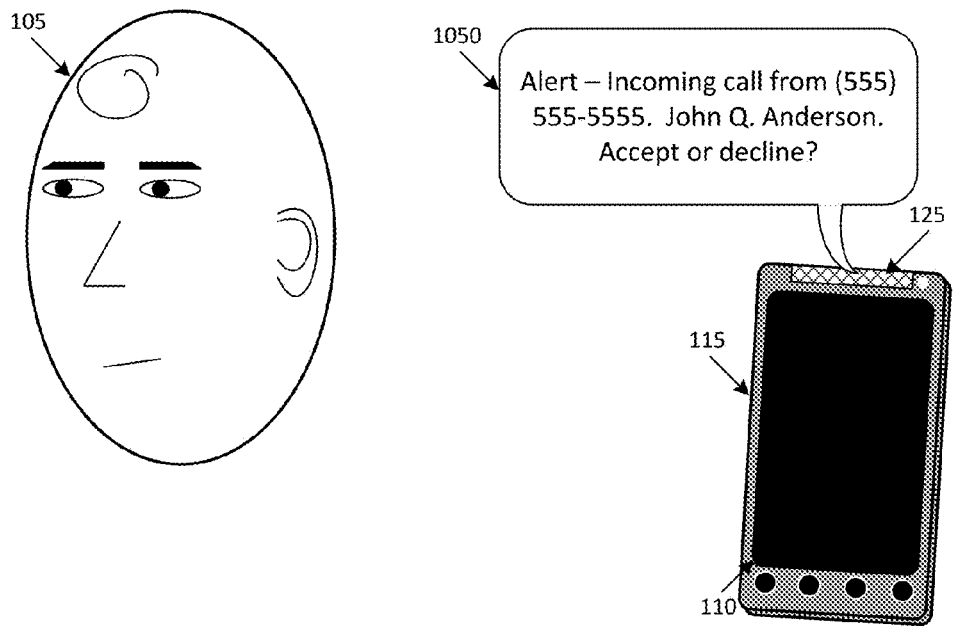

As shown in FIG. 10, user 105 may not be facing display screen 110. Gaze detection module 605 may classify the gaze of user 105 as not facing display screen 110, and communicate with module 615 to output notifications accordingly. For example, module 615 may cause user device 115 to output audible notification 1005 through speaker 125. As also shown in FIG. 10, display screen 110 of user device 115 may be blank. For example, if display screen 110 was blank, or powered off, before user device 115 provided audible notification 1005, display screen 110 may remain blank while presenting audible notification 1005, based on the gaze of user 105 classified as not facing display screen 110. In such an implementation, power may be saved by not displaying anything on display screen 110 when the gaze of user 105 is classified as not facing display screen 110.

Figure 11:
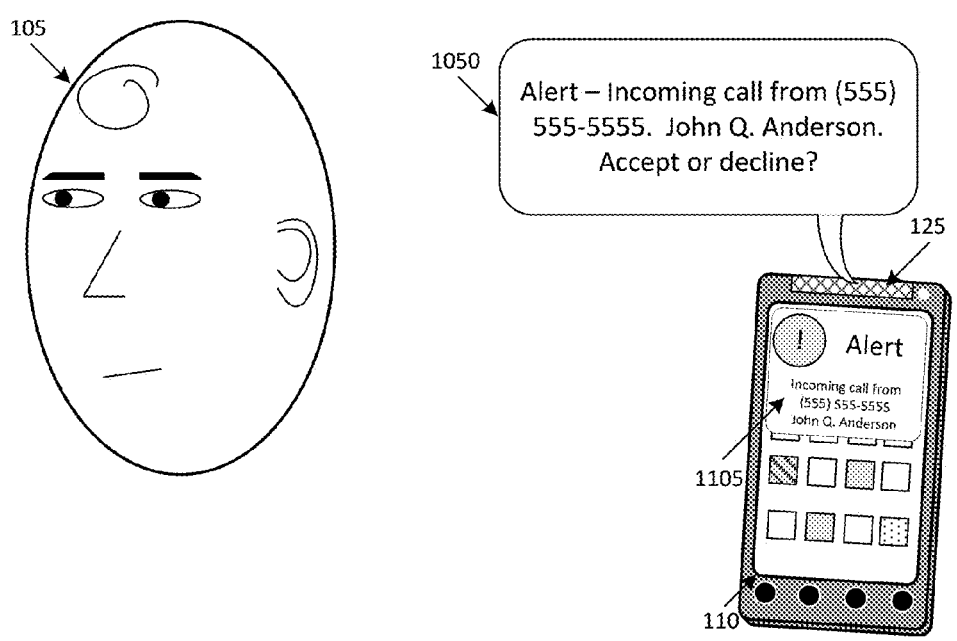

As shown in FIG. 11, user 105 may not be facing display screen 110. Gaze detection module 605 may classify the gaze of user 105 as not facing display screen 110, and communicate with module 615 to output notifications accordingly. For example, module 615 may cause user device 115 to output audible notification 1005 through speaker 125. Additionally, or alternatively, user device 115 may output visual notification 905 through display screen 110. Visual notification 1105, presented when the gaze of user 105 is classified as not facing display screen 110, may be different from visual notification 130, which is presented when user 105 is classified as facing display screen 110. For example, as shown in FIG. 11, visual notification 1105 may not include the "Accept" and "Decline" buttons included in visual notification 130.

Figure 12:
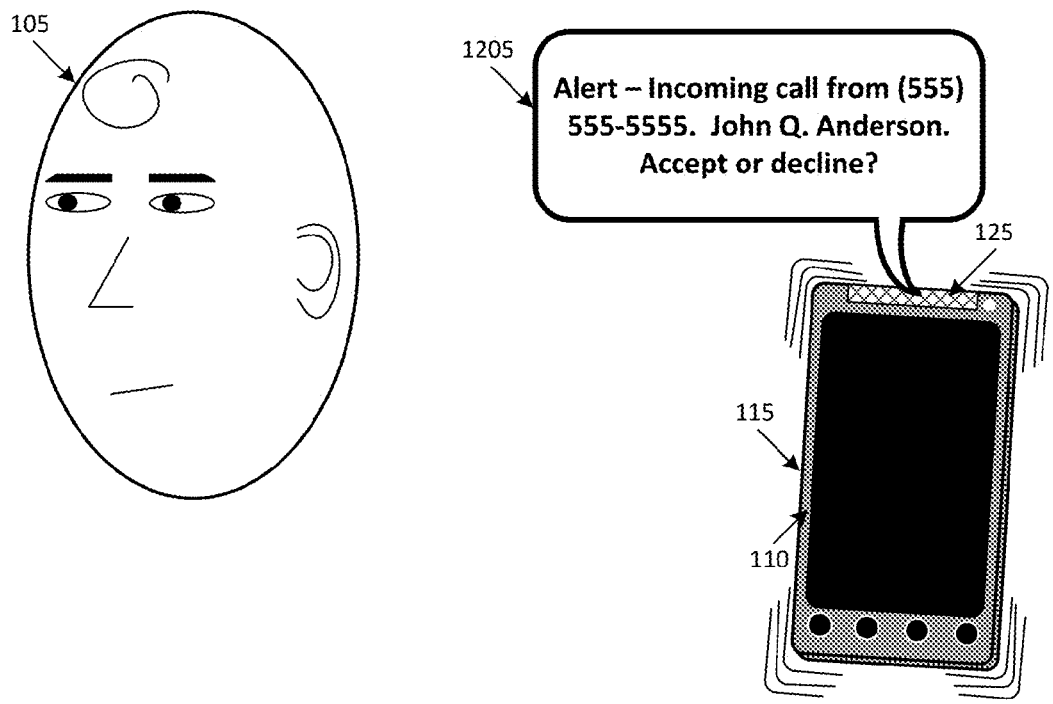

As shown in FIG. 12, multiple ones of the above-described notification techniques may be used in combination. In FIG. 12, gaze detection module 605 may classify the gaze of user 105 as not facing display screen 110, and communicate with module 615 to output notifications accordingly. For example, module 615 may cause user device 115 to output audible notification 1205 through speaker 125. Audible notification 1205 may be louder than audible notification 805, which is presented when the gaze of user 105 is classified as facing display screen 110. Additionally, audible notification 1205 may include words associated with the notification instead of the ringing of a ring tone, while audible notification 805 may include the ringing of a ring tone instead of words.

Additionally, as further shown in FIG. 12, display screen 110 of user device 115 may be blank. For example, if display screen 110 was blank, or powered off, before user device 115 provided audible notification 1205, display screen 110 may remain blank while presenting audible notification 1205, based on the gaze of user 105 classified as not facing display screen 110. In such an implementation, power may be saved by not displaying anything on display screen 110 when the gaze of user 105 is classified as not facing display screen 110.

Additionally, as also shown in FIG. 12, user device 115 may vibrate, based on the gaze of user 105 classified as not facing display screen 110. While some possible techniques, and combinations of techniques, have been described above, other techniques, and combinations of techniques, are possible.

Figure 13:
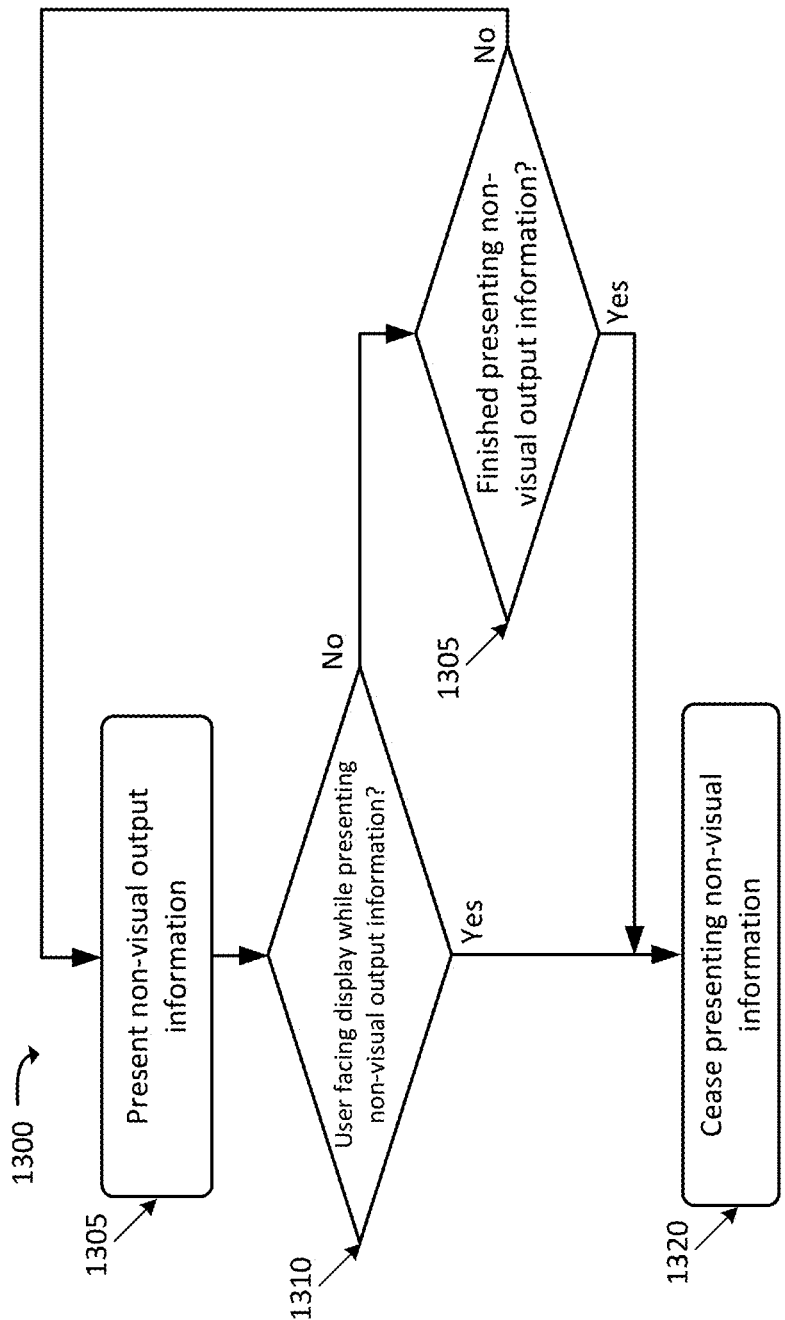
FIG. 13 illustrates a flowchart of an example process for providing information when a user is classified as facing away from a display of a user device.

FIG. 13 illustrates a flowchart of an example process 1300 for providing information when a user is classified as not facing a display of a user device. In one implementation, process 1300 may be performed by user device 115. In another implementation, process 1300 may be performed by one or more other components instead of, or possibly in conjunction with, user device 115.

Process 1300 may include presenting non-visual output information (block 1305). For example, as discussed above with block 735 of FIG. 7, user device 115 may present non-visual output information, such as an audible notification, a sensory notification, etc., when the gaze of user 105 is classified as not facing display screen 110. Process 1300 may further include classifying the gaze of user 105 as directed towards a display device associated with user device 115 or directed away from the display, while user device 115 presents the non-visual output information (block 1310). For example, gaze detection module 605 of user device 115 may continuously monitor and classify the gaze of user 105 as directed towards display screen 110 or as directed away from the display.

If the gaze of user 105 is classified as directed away from display screen 110 (block 1310—NO), process 1300 may further include determining whether user device 115 is finished presenting the non-visual output information (block 1315). For instance, if the non-visual output information includes audible output information, user device 115 may determine whether the audible output information has been fully outputted. If user device 115 determines that user device 115 has not finished outputting the non-visual output information (block 1315—NO), then process 1300 may return to block 1305. If, on the other hand, user device 115 determines that user device 115 has finished outputting the non-visual output information (block 1315—YES), then process 1300 may include ceasing presenting the non-visual information (block 1320). For example, user device 115 may cease presenting audible information when the audible information has been fully presented.

If the gaze of user 105 is classified as directed towards display screen 110 while device 115 presents the non-visual output information (block 1310—YES), then process 1300 may include ceasing presenting the non-visual information (block 1320). For example, user device 115 may interrupt the presenting of audible information, before the audible information has been fully presented. After ceasing the presentation of the non-visual information (at block 1320, user device 115 may further present information, such as visual information. For example, user device 115 may format output information as visual output information (similar to block 720) and present the formatted visual output information (similar to block 725).

While process 1300 was described as including the above-mentioned blocks 1305-1320, some or all of these blocks may be considered optional. Furthermore, certain blocks may be performed in parallel with other blocks.

Figure 14:
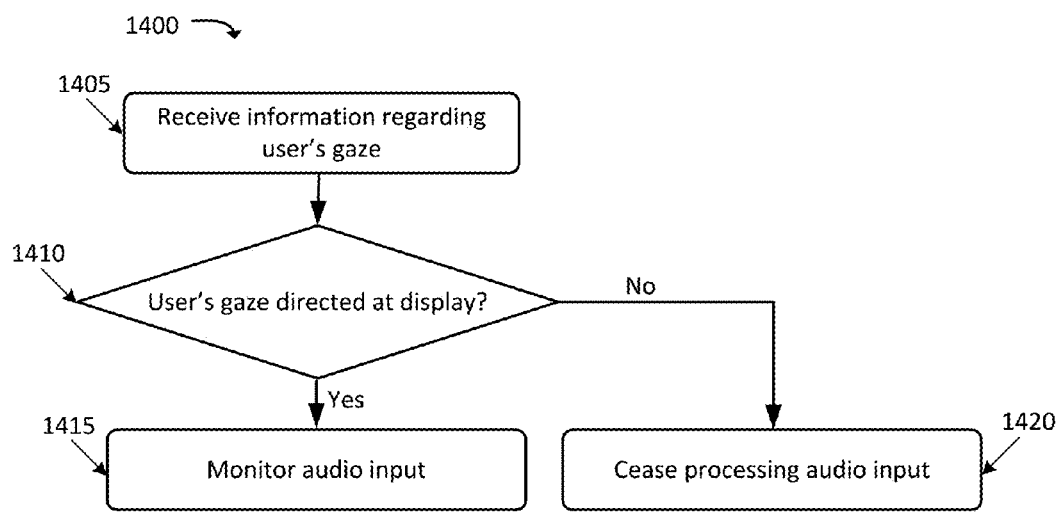
FIGS. 14 and 15 illustrate flowcharts of example processes for receiving vocal commands from a user based on classifying the user as facing a display of a user device or not.

FIG. 14 illustrates a flowchart of an example process 1400 for providing information when a user is classified as facing away from a display of a user device. In one implementation, process 1400 may be performed by user device 115. In another implementation, process 1400 may be performed by one or more other components instead of, or possibly in conjunction with, user device 115.

Process 1400 may include receiving information regarding a user's gaze (block 1405). For example, module 605 of user device 115 may receive information used to classify the gaze of user 105 as directed towards display screen 110 or as directed away from the display. As discussed above, the information may include video and/or image information captured by a camera, such as camera 120. As further discussed above, module 605 may classify user 105 as facing display screen 110 or as not facing the display.

If module 605 classifies the gaze of user 105 as directed towards display screen 110 (block 1410—YES), process 1400 may further include monitoring audio input (block 1415). For example, as discussed above, user device 115 may enable an audio input device, such as a microphone. When enabling the audio input device, user device 115 may place the audio input device into an active state, in which the audio input device consumes more power than a low-power or a no-power state. As also discussed above, when monitoring audio input, module 620 may receive and/or process audio information in order to determine whether user device 115 has received a vocal command.

If, on the other hand, module 605 classifies user 105 as not facing display screen 110 (block 1410—NO), process 1400 may cease processing audio input (block 1420). For example, as discussed above, user device 115 may disable an audio input device, such as a microphone. When disabling the audio input device, user device 115 may place the audio input device into a low-power or a no-power state, in which the audio input device consumes less power than an active state. Alternatively, when audio input processing is ceased, user device 115 may leave the audio input device in an active state. In such an implementation, user device 115 may receive audio input, but not process the audio input as vocal commands.

Figure 15:
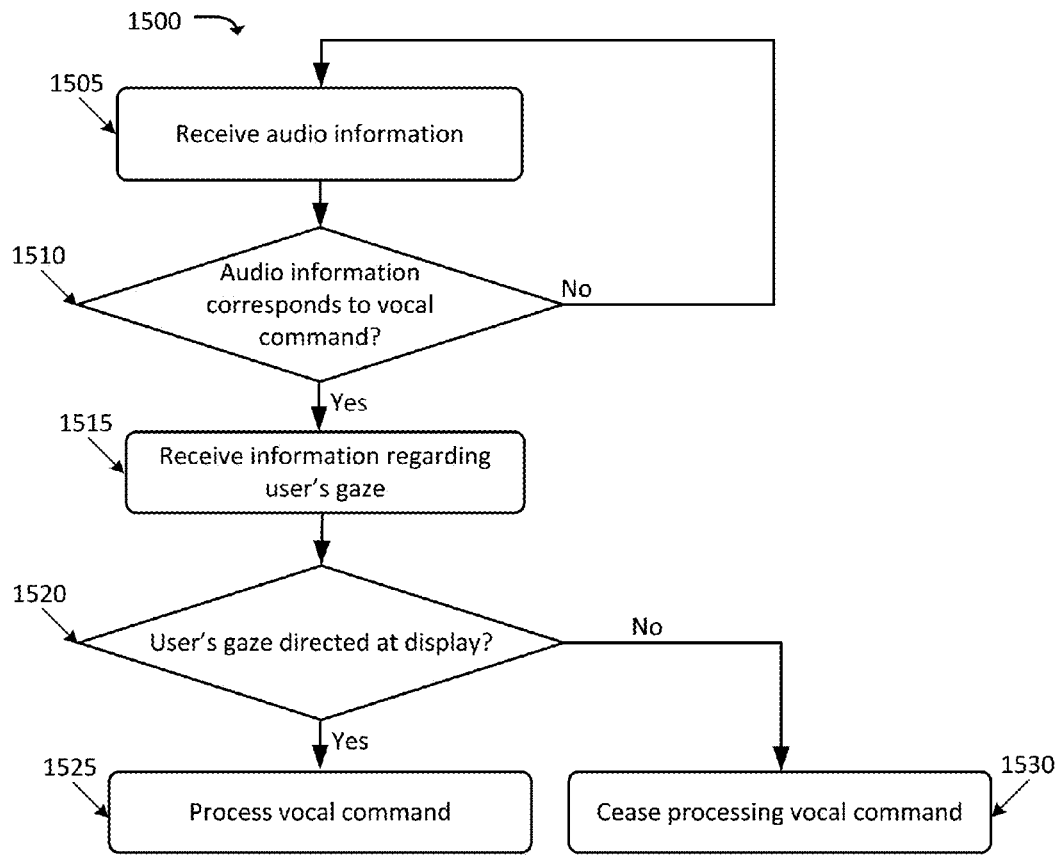

While FIG. 14 was described as an example of how to process audio input based on whether a user is classified as facing a display of user device 115, other example implementations are possible. FIG. 15 illustrates a flowchart of another example process 1500 of processing audio input based on classifying the gaze of a user as directed towards a display of user device 115 or as directed away from the display. In one implementation, process 1500 may be performed by user device 115. In another implementation, process 1500 may be performed by one or more other components instead of, or possibly in conjunction with, user device 115.

Process 1500 may include receiving audio information (block 1505). For example, module 620 of user device 115 may receive audio information from a microphone of user device 115. The audio information may correspond to a voice of a user of user device 115. As discussed above, module 620 may analyze the audio information in order to determine whether the audio information corresponds to a vocal command.

If the audio information does not correspond to a vocal command (block 1510—NO), process 1500 may include continuing to receive audio information (block 1505). User device 115 may continue analyzing the audio information to determine whether the audio information corresponds to a vocal command.

If, on the other hand, the audio information corresponds to a vocal command (block 1510—YES), process 1500 may include receiving information regarding the user's gaze (block 1515).

For example, module 605 of user device 115 may receive information used to classify the gaze of user 105 as directed towards display screen 110 or as directed away from the display. As discussed above, the information may include video and/or image information captured by a camera, such as camera 120. As further discussed above, module 605 may classify the gaze of user 105 as directed towards display screen 110 or as directed away from the display.

If module 605 classifies the gaze of user 105 as directed towards display screen 110 (block 1520—YES), process 1500 may further include processing the vocal command that corresponds to the received audio information (block 1525). Assume, for instance, that the audio information includes the word "call" immediately followed by a set of numeric digits. Module 620 may determine that the audio information corresponds to a vocal command by the user that instructs user device 115 to place a telephone call to a telephone number that corresponds to some or all of the set of numeric digits. User device 115 may process the vocal command (at block 1525) by placing the telephone call.

If, on the other hand, module 605 classifies the gaze of user 105 as directed away from display screen 110 (block 1520—NO), process 1500 may cease processing the vocal command that corresponds to the received audio information (block 1530). For example, assume again that the vocal command corresponds to a telephone call. If user device 115 receives this vocal command while user 105 is not facing display screen 110 of user device 115, user device 115 may not process this vocal command (at block 1530), and not place the telephone call.

Additionally, or alternatively, user device 115 may process the vocal command (at block 1530) differently than user device 115 would process the vocal command (at block 1525) if user 105 was classified as facing display screen 110. For example, while user device 115 may place a telephone call (at block 1525) without additional input if user 105 is facing display screen, user device 115 may request additional input from user 105 (at block 1530) if user 105 provides a vocal command and is classified as not facing display screen 110. For example, user device 115 may request a confirmation from user 105 to confirm whether user 105 intended to provide a vocal command. The request for the confirmation may be provided by user device 115 through a visual notification, and/or through a non-visual notification. In such an implementation, user device 115 may wait for the confirmation before processing the vocal command. In other words, in this implementation, user device 115 may not process the vocal command unless user device 115 receives input from the user in addition to the vocal command.

While example processes 1400 and 1400 were described above as example implementations of processing audio input based on classifying a user as facing a display of user device 115 or as not facing the display, other implementations are possible. For example, while an example was described above relating to a voice command to initiating a telephone call, any other type of voice command may be processed based on classifying a user as facing a display of user device 115 or as not facing the display.

For instance, user device 115 may use one or both of processes 1400 and/or 1500, and/or any other additional processes, in order to process voice commands that initiate the processing of voice commands, also known as "hot words." In such an implementation, assume that the phrase "call Jim Anderson" corresponds to a voice command that causes user device 115 to call a stored contact named "Jim Anderson." Further assume that the word "listen" is a hot word. If user device 115 determines that user 105 speaks the phrase "call Jim Anderson," user device 115 may not process the vocal command if user device 115 has not previously determined that user 105 has spoken the word "listen." Conversely, if user device 115 determines that user 105 speaks the word "listen," and then subsequently that user 105 speaks the phrase "call Jim Anderson," user device 115 may process the vocal command.

Additionally, or alternatively, user device 115 may use a combination of the hot word and the gaze of user 105 to determine whether to process a vocal command. Further to the example above, assume that user device 115 determines that user 105 speaks the word "listen," then subsequently speaks the phrase "call Jim Anderson," and is classified as not facing display screen 110. Since user 105 is classified as not facing display screen 110, user device 115 may not process the vocal command, even though user 105 has spoken the hot word before the vocal command. In another example, assume that user device 115 determines that user 105 speaks the word "listen," then subsequently speaks the phrase "call Jim Anderson," and is classified as facing display screen 110. Since user 105 is classified as facing display screen and has spoken the hot word, 110, user device 115 may process the vocal command.

FIGS. 16-20 illustrate an example of processing audio input based on whether user 105 is classified as facing a display screen of user device 115. FIGS. 16-20 are presented as an example sequence of events that may occur. For the purposes of the examples illustrated in these figures, assume that the word "listen" is a hot word, and that the word "search" corresponds to a vocal command that causes user device 115 to initiate a search.

Figure 16:
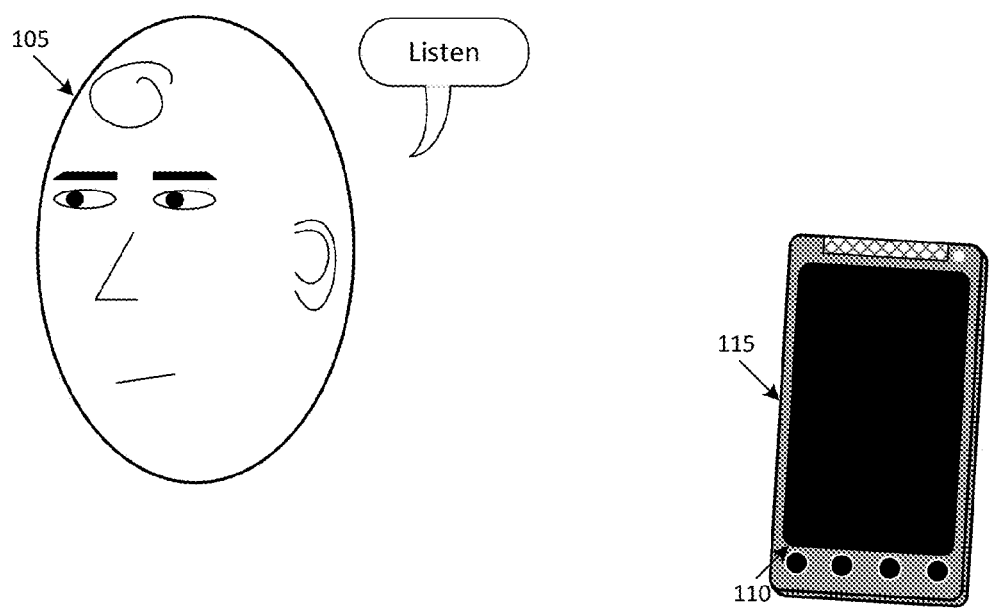
FIGS. 16-20 illustrate examples of receiving vocal commands from a user based on classifying the user as facing a display of a user device or as not facing the display.

As shown in FIG. 16, user 105 may face away from display screen 110 of user device 115. As also shown in FIG. 16, user 105 may speak the word "listen." Although "listen" is a hot word, user device 115 may cease processing subsequent voice commands, since user 105 is classified as not facing display screen 110.

Figure 17:
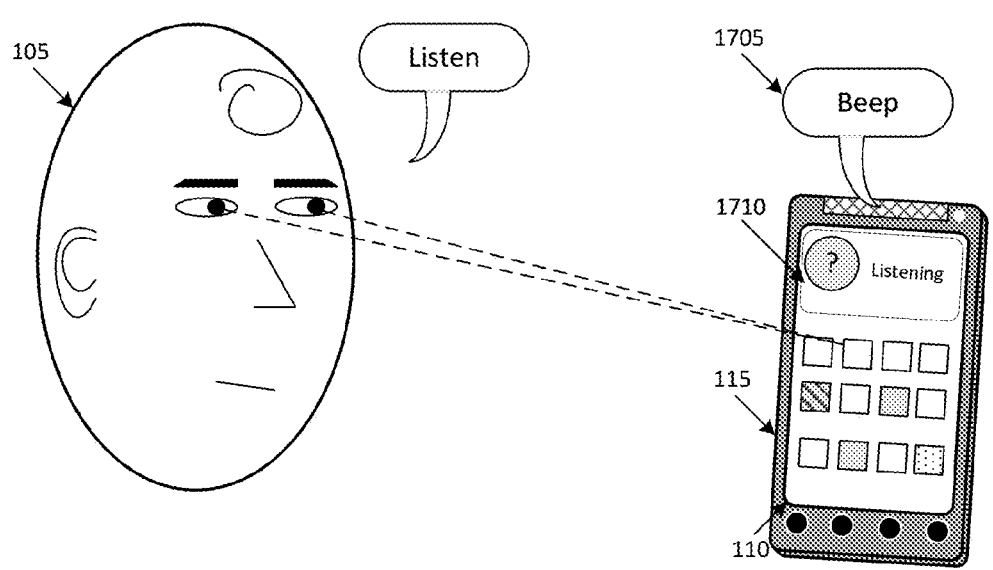

As shown in FIG. 17, user 105 may face display screen 110 of user device 115. As also shown in FIG. 17, user 105 may speak the word "listen." Gaze detection module 605 of user device 115 may classifier the gaze of user 105 as directed towards display screen 110. User device 115 may recognize that user 105 has spoken a hot word. Based on user device 115 identifying that user 105 has spoken a hot word, and further based on gaze detection module 605, classifying the gaze of user 105 as directed towards display 110, user device 115 may monitor further received audio information for a vocal command.

Additionally, or alternatively, user device 115 may provide feedback indicating that gaze detection module 605 has classified the gaze of user 105 as directed towards display screen 110 and that user 105 has spoken a hot word. For example, user device 115 may provide an audible notification 1705, such as a beep or other noise, and/or a visual notification, such as a visual alert 1710 on display screen 110.

Figure 18:
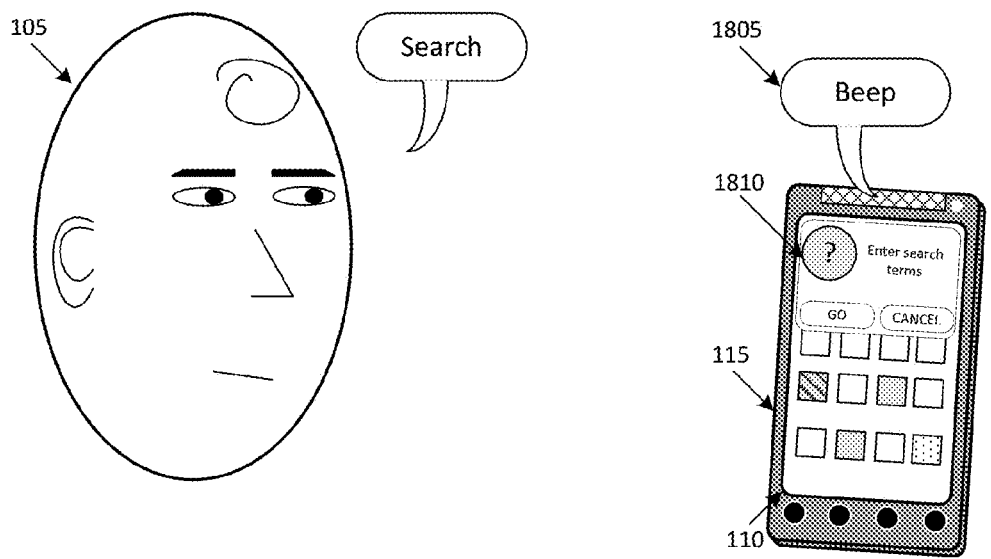

As shown in FIG. 18, user device 115 may determine that user 105 has spoken the word "search," after speaking the hot word "listen" while looking at display screen 110. User device 115 may process the word "search" as a vocal command that causes user device 115 to initiate a search, such as an Internet search. In response, user device 115 may allow user 105 to input one or more terms of a search query. For example, user device 115 may allow user 105 to input one or more search terms through touch input, such as by using a keypad or touch screen, and/or through voice input.

In one implementation, user device 115 may only process a voice command (such as "search") when user 105 is classified as facing display screen 110. In another implementation, user device 115 may process a voice command when user 105 is classified as not facing display screen 110. In yet another implementation, user device 115 may process a voice command independent of user 105 classified as facing display screen 110, so long as user device 115 has processed the hot word.

User device 115 may provide feedback indicating that gaze detection module 605 has classified user 105 as facing display screen 110 and that user 105 has issued a vocal command after speaking a hot word. For example, user device 115 may provide an audible notification 1805, such as a beep or other noise, and/or a visual notification, such as a visual alert 1810 on display screen 110.

Figure 19:
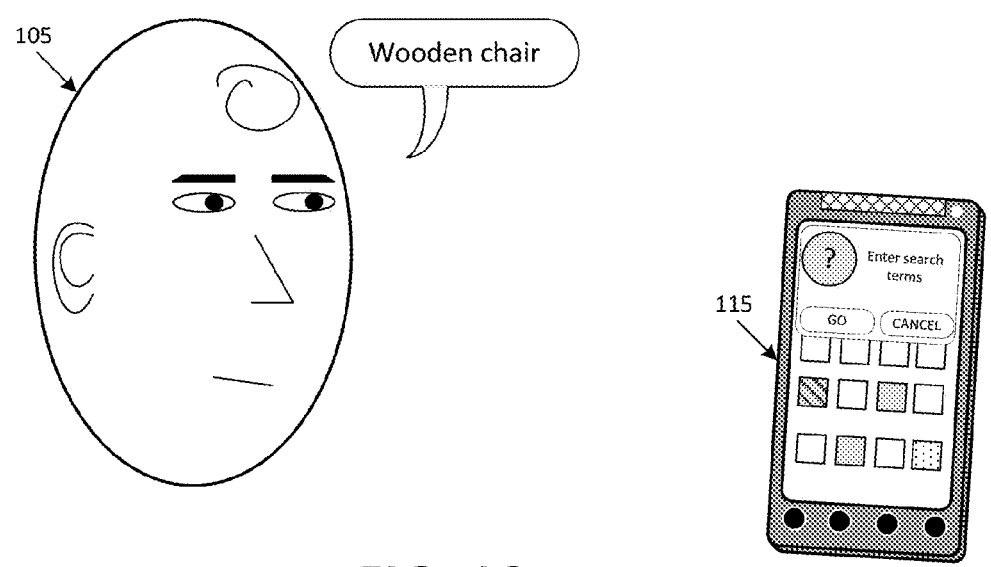

As shown in FIG. 19, user device 115 may determine that user 105 has spoken the phrase "wooden chair," after issuing a vocal command that causes user device 115 to initiate a search. User device 115 may process the phrase "wooden chair" as terms of a search query. For example, user device 115 may provide the search query to a search engine, and receive information regarding search results that are responsive to the search query.

Figure 20:
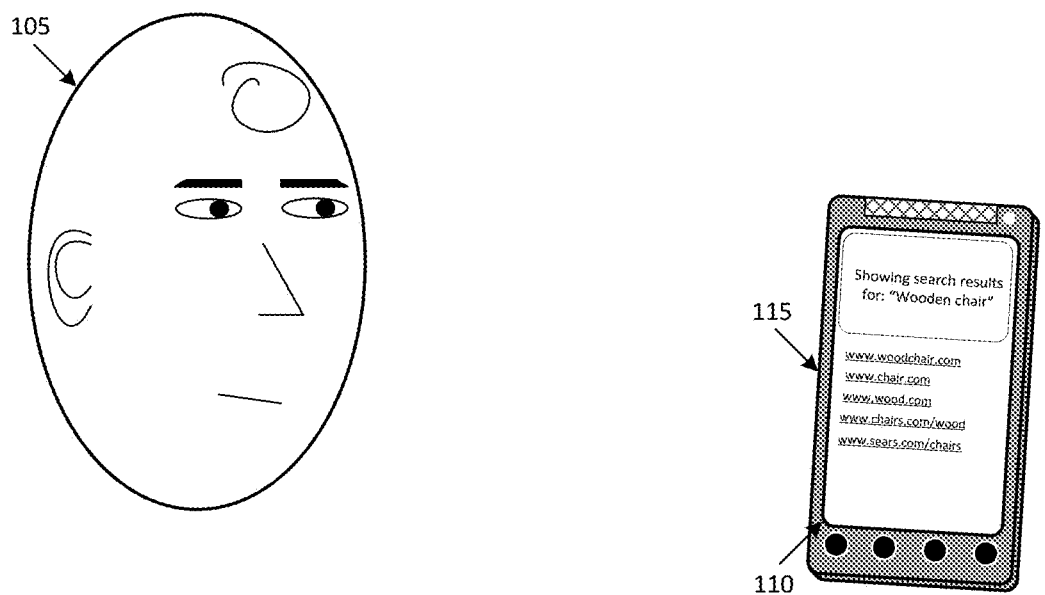

As shown in FIG. 20, user device 115 may display a list of search results on display screen 110. Additionally, or alternatively, user device 115 may provide an audible indication of the search results, such as by presenting information regarding one or more of the search results through speaker 125. For example, if gaze detection module 605 classifies user 105 as not facing display screen 110, user device 115 may provide the audible indication.

An implementation, described herein, may allow a user device to control how the user device receives and/or outputs information, based on a user's gaze with respect to a display device associated with the user device. By controlling how the user device outputs information based on the user's gaze, the user device may eliminate the inefficient and/or redundant presentation of information that the user may not be able to, or may not need to, perceive. Additionally, by controlling how the user device receives information based on the user's gaze, the user device may reduce the possibility of errors that may occur, such as by erroneously processing audio information as vocal commands.

Furthermore, controlling how the user device inputs and/or outputs information may save battery life of the user device. For example, if a user device does not present a visual notification, based on determining that the user is not facing a display screen associated with the user device, the user device has saved battery power that the user device would have expended in presenting the visual notification.

The foregoing description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 7 and 13-15 the order of the blocks may be modified in other implementations. Further, non-dependent blocks may be performed in parallel.

Furthermore, while some examples were described above in the context of a display screen that is attached to, or integrated in, a user device, other examples may be possible where a display screen is separate from, or is external to, a user device. For example, a user device may provide feedback based on classifying a user as facing an external video monitor, such as a television or a computer screen. Additionally, or alternatively, the user device may provide feedback based on classifying a user as facing any arbitrary direction.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
receiving, by a user device, audio data corresponding to an utterance of a user;
determining that a first portion of a transcription of the utterance includes a keyword that is associated with a voice command;
after determining that the first portion of the transcription of the utterance includes the keyword that is associated with the voice command, determining, by the user device, that an image of the user does not include one or more features that are characteristic of the user facing a display of the user device; and
in response to determining that the image of the user does not include one or more features that are characteristic of the user facing the display of the user device, determining, by the user device, to prevent a second portion of the transcription of the utterance from being processed as a voice command.

2. The method of claim 1, comprising:
discarding the second portion of the transcription without inputting the second portion of the transcription to a dialog engine based on determining to prevent the second portion of the transcription of the utterance from being processed as a voice command.

3. The method of claim 1, comprising:
generating the image of the user by a camera on the user device after determining that the first portion of the transcription of the utterance includes the keyword that is associated with the voice command.

4. The method of claim 1, wherein the voice command is a command for the user to take an action other than taking a picture.

5. The method of claim 1, wherein determining the image does not include one or more features that are characteristic of the user facing a display of the user device comprises:
determining a direction of a gaze of the user; and
classifying the gaze of the user as a gaze that is not directed toward the display of the user device.

6. The method of claim 1, wherein determining that the image does not include one or more features that are characteristic of the user facing a display of the user device comprises:
determining that one or more particular facial features are not visible in the image.

7. The method of claim 1, wherein determining that the image does not include one or more features that are characteristic of the user facing a display of the user device comprises:
determining an orientation of two or more particular facial features of the user with respect to each other.

8. The method of claim 1, wherein determining that the image includes one or more features that are characteristic of the user facing a display of the user device comprises:
comparing the image to a different image in which the user is labeled as facing the display of the mobile device.

9. A system comprising:
one or more computers and one or more storage devices storing instructions that are operable, when executed by the one or more computers, to cause the one or more computers to perform operations comprising:
receiving, by a user device, audio data corresponding to an utterance of a user;
determining that a first portion of a transcription of the utterance includes a keyword that is associated with a voice command;
after determining that the first portion of the transcription of the utterance includes the keyword that is associated with the voice command, determining, by the user device, that an image of the user does not include one or more features that are characteristic of the user facing a display of the user device; and
in response to determining that the image of the user does not include one or more features that are characteristic of the user facing the display of the user device, determining, by the user device, to prevent a second portion of the transcription of the utterance from being processed as a voice command.

10. The system of claim 9, wherein the operations further comprise:
discarding the second portion of the transcription without inputting the second portion of the transcription to a dialog engine based on determining to prevent the second portion of the transcription of the utterance from being processed as a voice command.

11. The system of claim 9, wherein the operations further comprise:
generating the image of the user by a camera on the user device after determining that the first portion of the transcription of the utterance includes the keyword that is associated with the voice command.

12. The system of claim 9, wherein the voice command is a command for the user to take an action other than taking a picture.

13. The system of claim 9, wherein determining the image does not include one or more features that are characteristic of the user facing a display of the user device comprises:
determining a direction of a gaze of the user; and
classifying the gaze of the user as a gaze that is not directed toward the display of the user device.

14. The system of claim 9, wherein determining that the image does not include one or more features that are characteristic of the user facing a display of the user device comprises:
determining that one or more particular facial features are not visible in the image.

15. The system of claim 9, wherein determining that the image does not include one or more features that are characteristic of the user facing a display of the user device comprises:
determining an orientation of two or more particular facial features of the user with respect to each other.

16. The system of claim 9, wherein determining that the image includes one or more features that are characteristic of the user facing a display of the user device comprises:
comparing the image to a different image in which the user is labeled as facing the display of the mobile device.

17. A non-transitory computer-readable medium storing software comprising instructions executable by one or more computers which, upon such execution, cause the one or more computers to perform operations comprising:

receiving, by a user device, audio data corresponding to an utterance of a user;

determining that a first portion of a transcription of the utterance includes a keyword that is associated with a voice command;

after determining that the first portion of the transcription of the utterance includes the keyword that is associated with the voice command, determining, by the user device, that an image of the user does not include one or more features that are characteristic of the user facing a display of the user device; and in response to determining that the image of the user does not include one or more features that are characteristic of the user facing the display of the user device, determining, by the user device, to prevent a second portion of the transcription of the utterance from being processed as a voice command.

18. The medium of claim 17, wherein the operations further comprise:

discarding the second portion of the transcription without inputting the second portion of the transcription to a dialog engine based on determining to prevent the second portion of the transcription of the utterance from being processed as a voice command.

19. The medium of claim 17, wherein the operations further comprise:

generating the image of the user by a camera on the user device after determining that the first portion of the transcription of the utterance includes the keyword that is associated with the voice command.

20. The medium of claim 17, wherein the voice command is a command for the user to take an action other than taking a picture.

\* \* \* \* \*

UNITED STATES PATENT AND TRADEMARK OFFICE
CERTIFICATE OF CORRECTION

| | | |
|---|---|---|
| PATENT NO. | : 9,526,127 B1 | |
| APPLICATION NO. | : 13/676517 | |
| DATED | : December 20, 2016 | |
| INVENTOR(S) | : Taubman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 239 days.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*